United States Patent
Chang et al.

(10) Patent No.: US 6,247,890 B1
(45) Date of Patent: Jun. 19, 2001

(54) AUTOMATIC GOODS PICKING DEVICE

(75) Inventors: Wei Chang, Hsinchu; Sheng-Feng Liu, Tao Yuan; Hai-Chiao Sun, Main Li; Chin-Lu Huang, Tao Yuan; Shiuan-I Shau, Taichung Hsien, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/181,746

(22) Filed: Oct. 29, 1998

(30) Foreign Application Priority Data

Sep. 8, 1998 (TW) ................................................ 87114866

(51) Int. Cl.[7] .................................................. B65G 59/06
(52) U.S. Cl. .................................. 414/795.7; 414/797.4; 414/797.6; 414/797.9
(58) Field of Search ............................ 414/797.9, 797.6, 414/795.7, 797.4, 273, 280, 417, 268; 700/216

(56) References Cited

U.S. PATENT DOCUMENTS

| | | | |
|---|---|---|---|
| 5,064,341 | * 11/1991 | Pippin | 414/797.6 |
| 5,271,703 | 12/1993 | Lindqvist et al. . | |
| 5,439,345 | * 8/1995 | Ivo | 414/797.7 |
| 5,755,551 | * 5/1998 | Saeki et al. | 414/797.6 |
| 5,755,552 | * 5/1998 | Iwasaka et al. | 414/797.9 |
| 6,061,607 | * 5/2000 | Bradley et al. | 700/216 |

* cited by examiner

Primary Examiner—Christopher P. Ellis
Assistant Examiner—Khoi H. Tran
(74) Attorney, Agent, or Firm—Browdy & Neimark

(57) ABSTRACT

An automatic goods picking device has a frame provided at least in one side thereof with a placing platform and a support rod which is provided with a plurality of goods placing areas each being fastened by two fastening members to form a stacking space along with the placing platform. The support rod is provided with a horizontal connection portion. The fastening members are respectively provided with a vertical connection portion enabling the fastening member to move adjustably upwards, downwards, leftwards, and rightwards such that a predetermined position of the vertical connection portion is corresponding in location to a predetermined position of the horizontal connection portion of the support rod, so as to form jointly with the placing platform a stacking space for goods of various heights and widths by using a fastening object. A plurality of goods discharging mechanisms are mounted at the bottom of the placing platform such that the goods discharging mechanism are corresponding in location to the bottoms of the goods placing areas for discharging goods located in the goods placing areas. The device is controlled by a method comprising a control structure which is composed of a monitor computer and a programmable control device PLC. The monitor computer is used to retrieve the order data, which are then transmitted to PLC responsible for the control of mechanism actions of the device.

8 Claims, 10 Drawing Sheets

| goods placing areas | 13A | 13B | 13C | 13D | 13E | 13F | 13G | 13H | 13I | 13J | 13K | 13L | 13M | 13N | 13O | 13P |
|---|---|---|---|---|---|---|---|---|---|---|---|---|---|---|---|---|
| goods selection quantities | 03 | 00 | 08 | 00 | 01 | 00 | 00 | 00 | 11 | 00 | 00 | 00 | 00 | 00 | 00 | 00 |
| goods selection to be or not to be done | 1 | 0 | 1 | 0 | 1 | 0 | 0 | 0 | 1 | 0 | 0 | 0 | 0 | 0 | 0 | 0 |
| | A | | | | | 8 | | | | 8 | | | 0 | | | |

FIG. 9

AUTOMATIC GOODS PICKING DEVICE

FIELD OF THE INVENTION

The present invention relates generally to an automatic goods picking machine, and more particularly to an automatic goods picking device capable of adjusting flexibly to the order requests for the goods items of various sizes, and a method for enhancing the efficiency of the automatic goods picking device.

BACKGROUND OF THE INVENTION

In light of cost control and competitive pressure, warehouses must make an effort to fill correctly and quickly the orders placed by the retail stores. The manual selection of goods ordered by the retail stores is not only time-consuming but also prone to human errors. The daily operations of the warehouses can be streamlined by the automatic goods picking machine, which is particularly suitable for use in selecting pharmaceutical products, cosmetics, compact disks, video tapes, cigarettes, etc., which are generally packaged in boxes.

The U.S. Pat. No. 5,271,703 discloses an automatic order selection system, which is capable of responding to simultaneous order requests and composed of an A-frame having a plurality of goods placing areas. Located on each of the goods placing areas are a plurality of the boxed goods which are stacked together. Located under each of the goods placing areas is a goods discharging mechanism capable of discharging selectively the goods to a conveyer by which the goods are transported to the distribution cartons.

Such a prior art automatic order selection system as described above is defective in design in that the operation of the goods discharging mechanism is vulnerable to stoppage under the circumstance that the boxes are not stacked in an orderly manner, and that the stacked boxes are of various dimensions, and further that the boxes are not stacked uniformly in terms of height. In addition, an excessively large or tall pile of boxes in the goods placing areas is rather prone to give way to knock down the adjoining piles of boxes. In short, the efficiency of the prior art automatic order selection system can be undermined by the incidents described above.

Moreover, the prior art automatic order selection system is designed to operate under the circumstance in which a small quantity of various kinds of goods is to be processed. Such a process calls for the employment of the computer and the control device, by which a substantial amount of relevant data must be processed in order to complete the execution of the entire goods selection process. As a result, the operating efficiency of the prior art automatic order selection system is hampered by the fact that the data transmission speed is slower than the execution speed.

SUMMARY OF THE INVENTION

It is therefore the primary objective of the present invention to provide an automatic goods picking device and a method for controlling the device which is provided with a goods placing area that can be flexibly adjusted to suit the goods of various sizes.

It is another objective of the present invention to provide an automatic goods picking device and a method for controlling the device which is provided with a goods placing area capable of holding the stacked goods stably to prevent the collapse of the stacked goods.

It is still another objective of the present invention to provide an automatic goods picking device and a method for controlling the device such that the data transmission speed is accelerated, and that the efficiency of the device is greatly enhanced.

In keeping with the principle of the present invention, the foregoing objectives of the present invention are attained by an automatic goods picking device and a method for controlling the device, which consists of a frame provided in one side thereof with at least a placing platform and a support rod which is in turn provided with a plurality of goods-placing areas. Each of the goods placing areas is mounted on the support rod by two fastening members such that it forms a stacking space along with the placing platform. The support rod is provided thereon with a horizontal connection portion. Each of the fastening members is provided a vertical connection portion. The fastening members can be adjustably moved upwards, downwards, leftwards, and rightwards so as to enable the predetermined position of the vertical connection portion of each fastening member to be corresponding in location to the predetermined position of the horizontal connection portion of the support rod for forming the stacking spaces of various sizes along with the placing platform to facilitate the stacking of various goods different in height and width. A plurality of goods discharging mechanisms are mounted at the bottom of the placing platform such that the goods discharging mechanisms are respectively corresponding in location to the goods placing areas. The control mechanism is formed of a monitor computer and a programmable control device PLC. The monitor computer is used to retrieve the order data, which are subsequently transmitted to the PLC responsible for the control of mechanical actions.

The foregoing objectives, features and functions of the present invention will be more readily understood upon a thoughtful deliberation of the following detailed description of the present invention with reference to the accompanying drawings.

BRIEF DESCRIPTION OF THE DRAWINGS

FIG. 9 shows a descriptive table of the data transmission coding mode of a first preferred embodiment of the control method of the present invention.

DETAILED DESCRIPTION OF THE INVENTION

Figure 1:
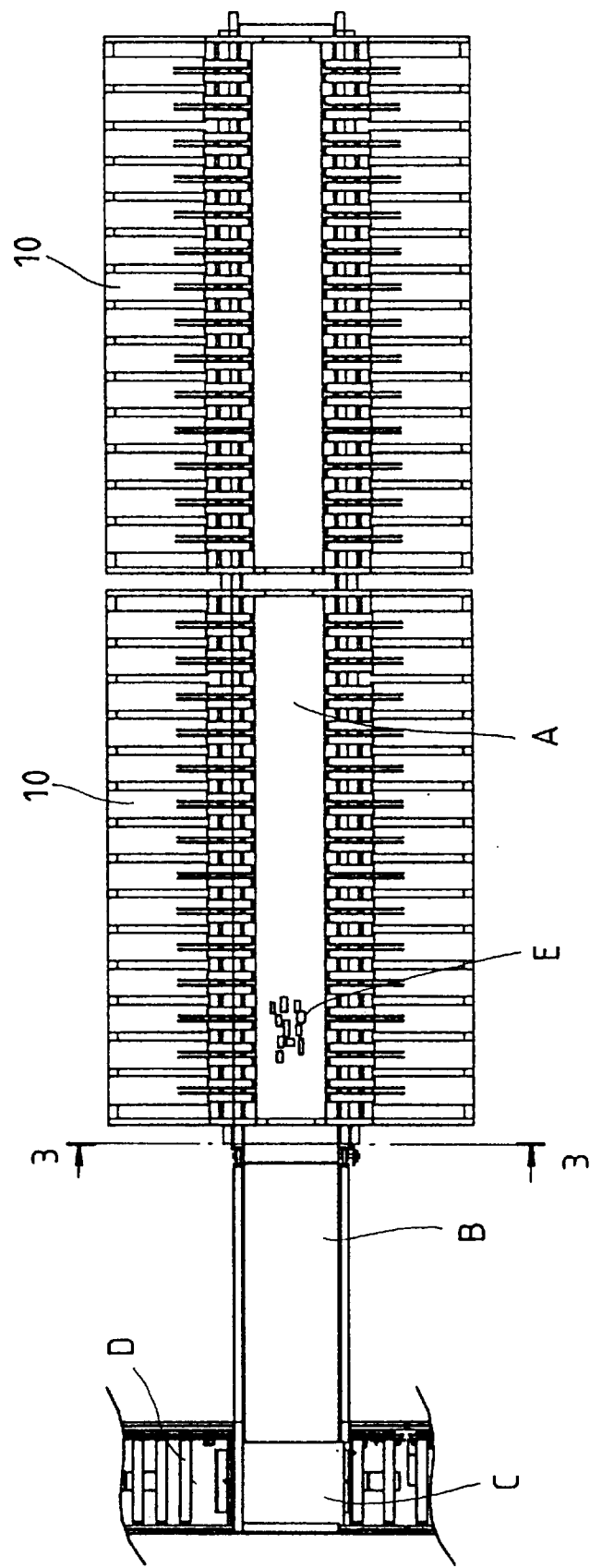
FIG. 1 shows a top view of an entire system of the present invention.

As shown in FIG. 1, an entire goods picking system has an automatic goods picking machine 10, a first belt conveyor A, a second belt conveyor B, a distribution carton C, and a roller conveyor D. the automatic goods picking machine 10 is capable of discharging in an automatic manner the goods E listed on the order to the first belt conveyor A and then to the second belt conveyor B via which the goods E is transferred to the distribution carton C.

Figure 2:
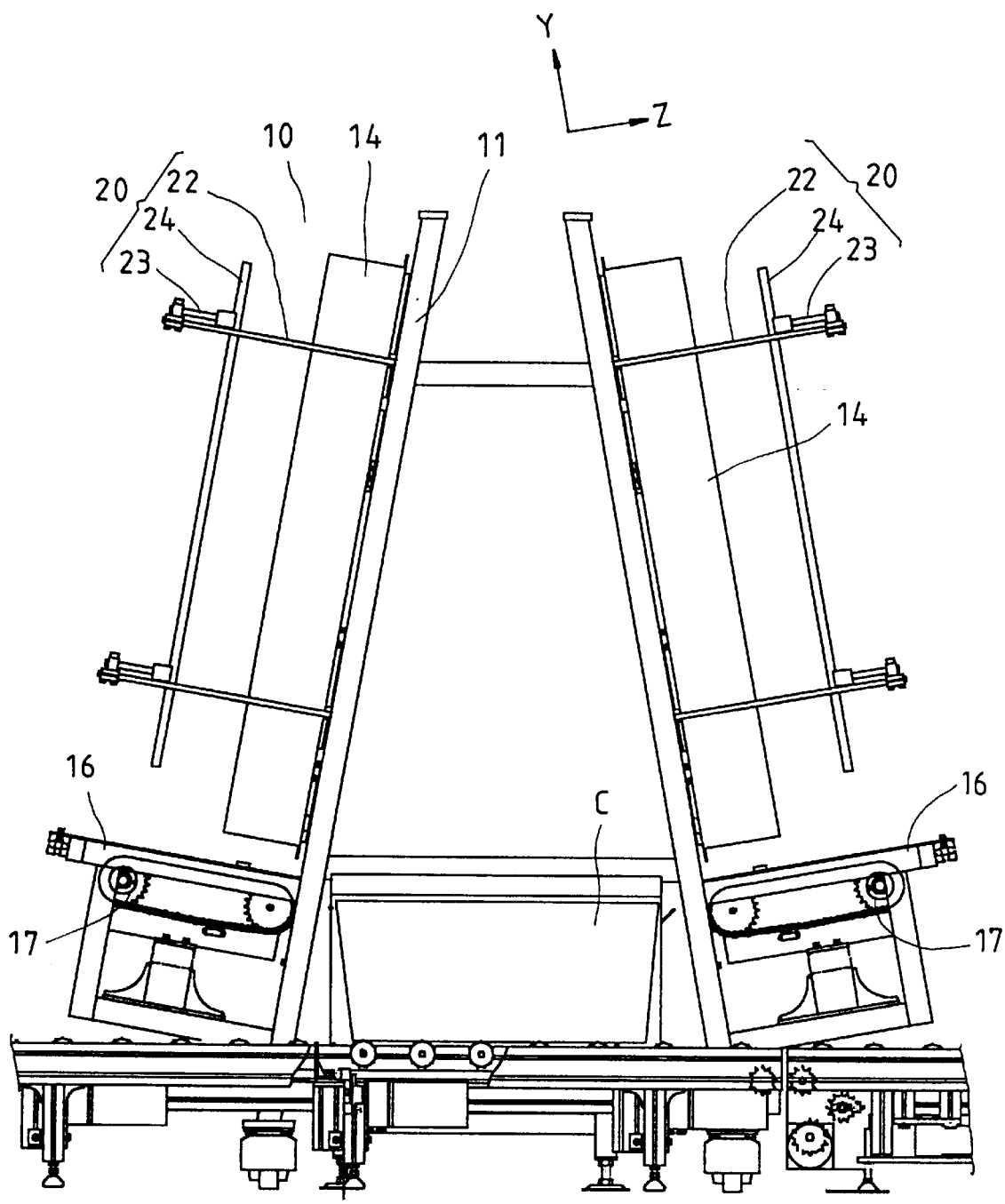
FIG. 2 shows a schematic view taken in the direction indicated by a line 2—2 as shown in FIG. 1.
Figure 3:
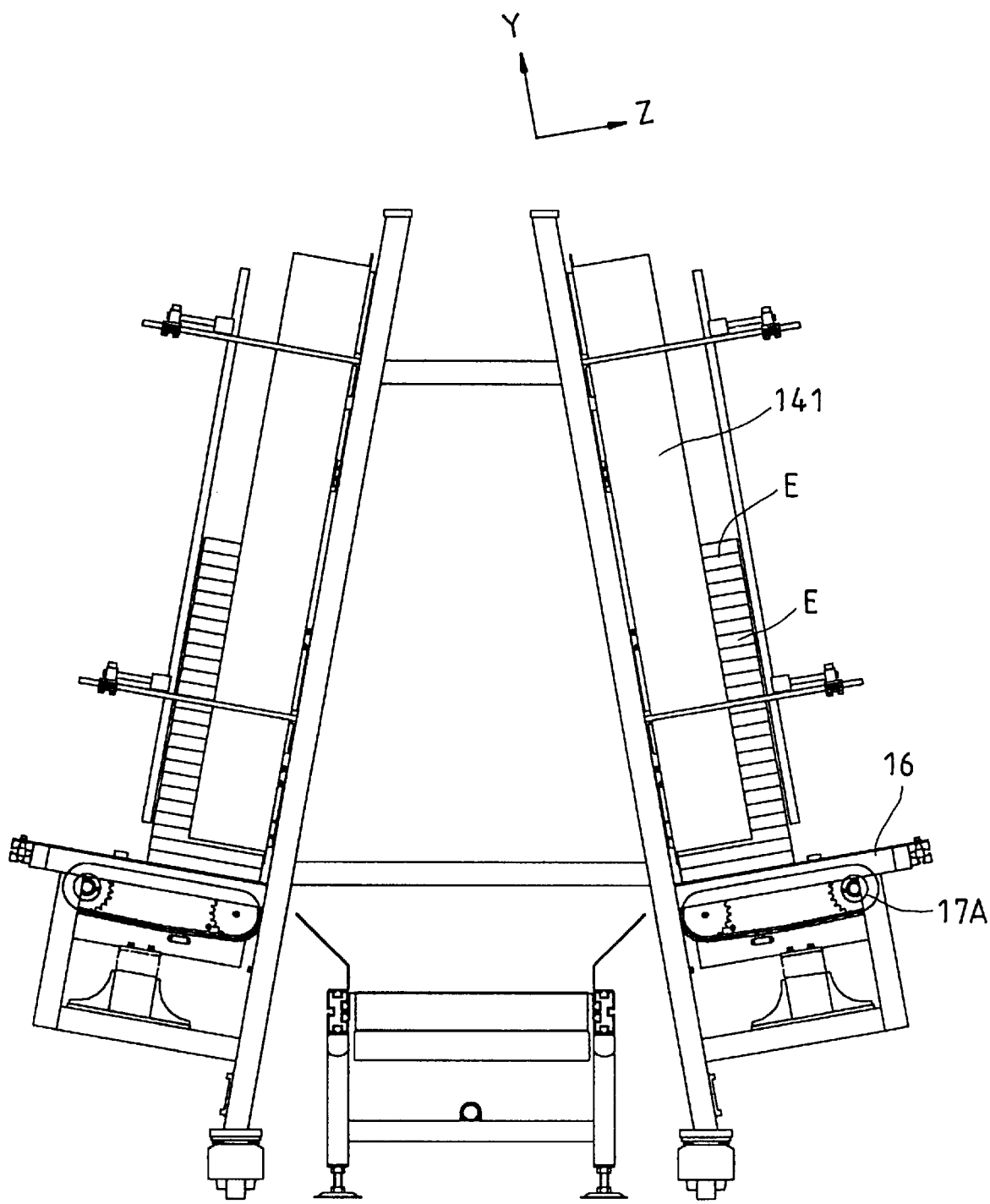
FIG. 3 shows a schematic view taken in the direction indicated by a line 3—3 as shown in FIG. 1.
Figure 4:
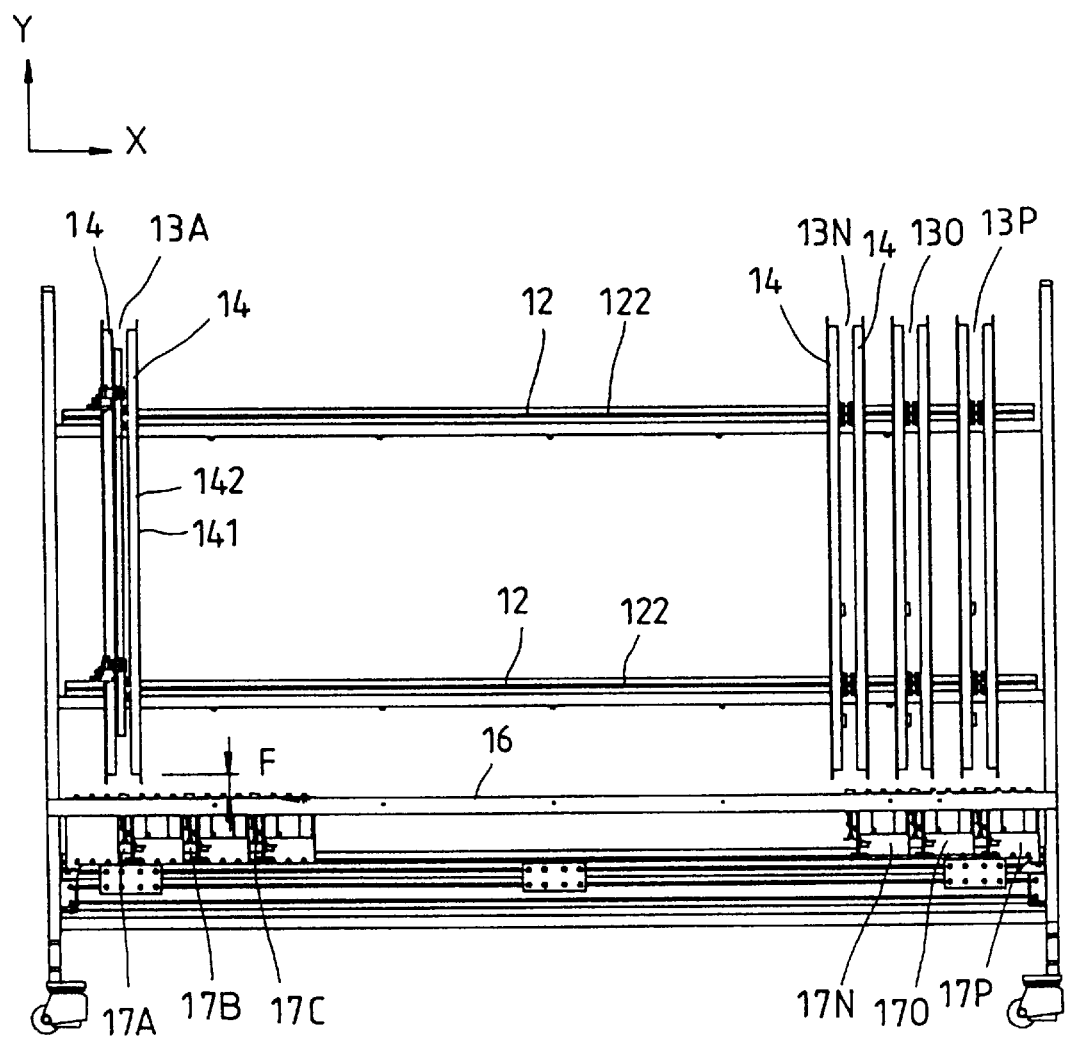
FIG. 4 is a side view of FIG. 3.
Figure 5:
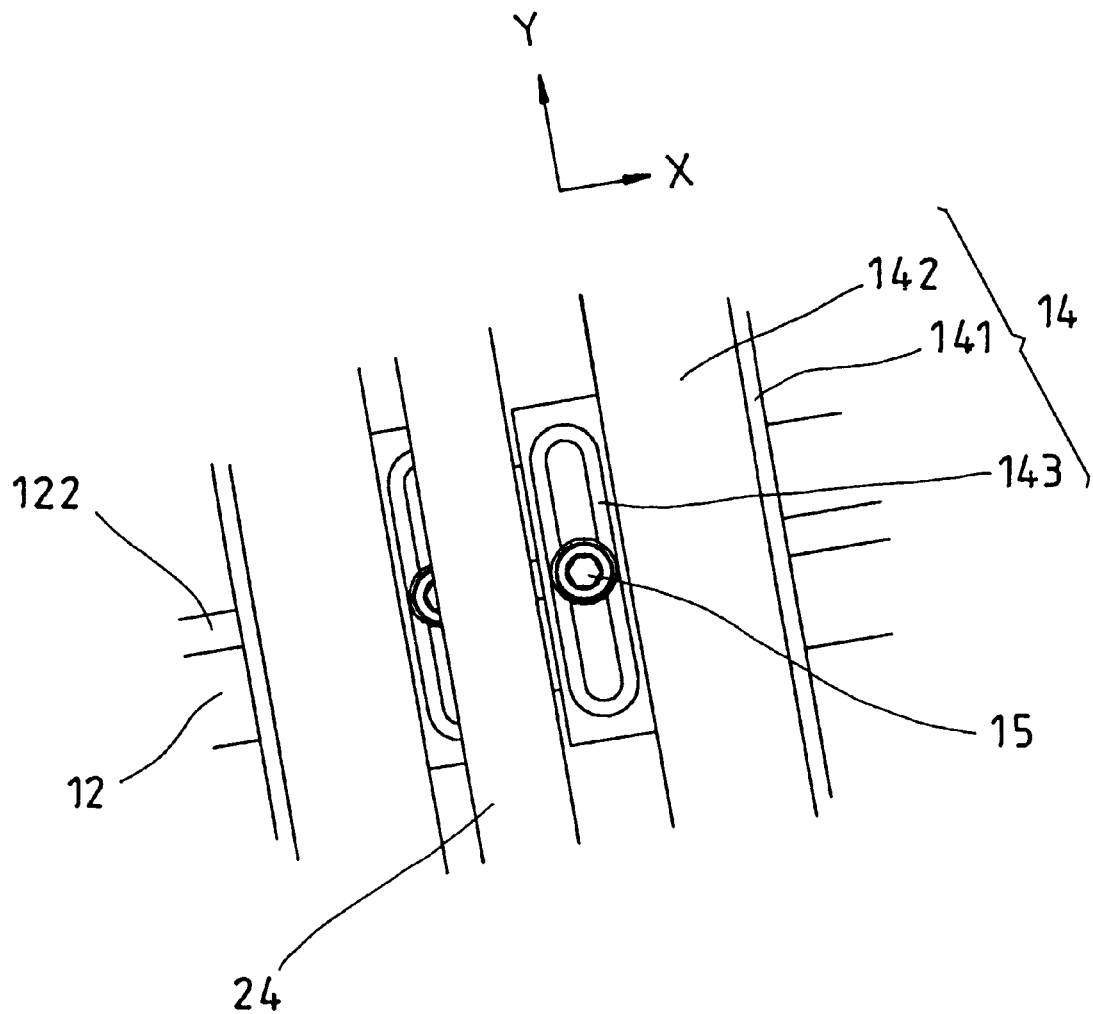
FIG. 5 is an enlarged schematic view showing the fastening of the support rod and the fastening members of each goods placing area as shown in FIG. 4.

Now referring to FIGS. 2–8, the automatic goods picking machine 10 of the present invention is shown to comprise a frame 11, which looks like an A-frame from the front view thereof, as shown in FIGS. 2–4. The frame 11 is provided respectively on both sides thereof with two support rods 12, and in the bottom thereof with a placing platform 16. Each support rod is provided thereon with a plurality of goods placing areas 13A, 13B, 13C, . . . 13N, 13O, and 13P, each of which is mounted on the support rods 12 by two fastening member 14 to form a stacking space along with the placing platform 16, thereby enabling the stacking spaces so formed to accommodate the goods of the same kind or various kinds. The support rod 12 is respectively provided in the top thereof and the side thereof with a horizontal connection portion 121 (122) which is of a horizontal slot. The fastening members 14 are of an L-shaped platelike construction and provided respectively with an embracing plate 141 and a connection plate 142 which is provided in the upper and the lower ends thereof with a vertical connection portion 143 of a long hole construction, as shown in FIG. 5.

A predetermined position of the vertical connection portion 143 of the fastening member 14 is then adjusted to be corresponding in location to a predetermined position of the horizontal connection portion 122 of the support rod 12. By using a fastening object 15 (a screw with a nut) and via the above members, the positions of X Y directions of each fastening member 14 can be controlled so as to enable the left-right adjusting operation (X direction) to be suitable for use in the width of various goods. The up and down (Y direction) adjusting operation of the fastening member 14 is suitable for use in the height of various goods. The interval F between the bottom of the connection plate 142 of the fastening member 14 and the placing platform 16 is dependent on the height of goods. The height formed by the interval is greater than the height of a unit goods.

Figure 6:
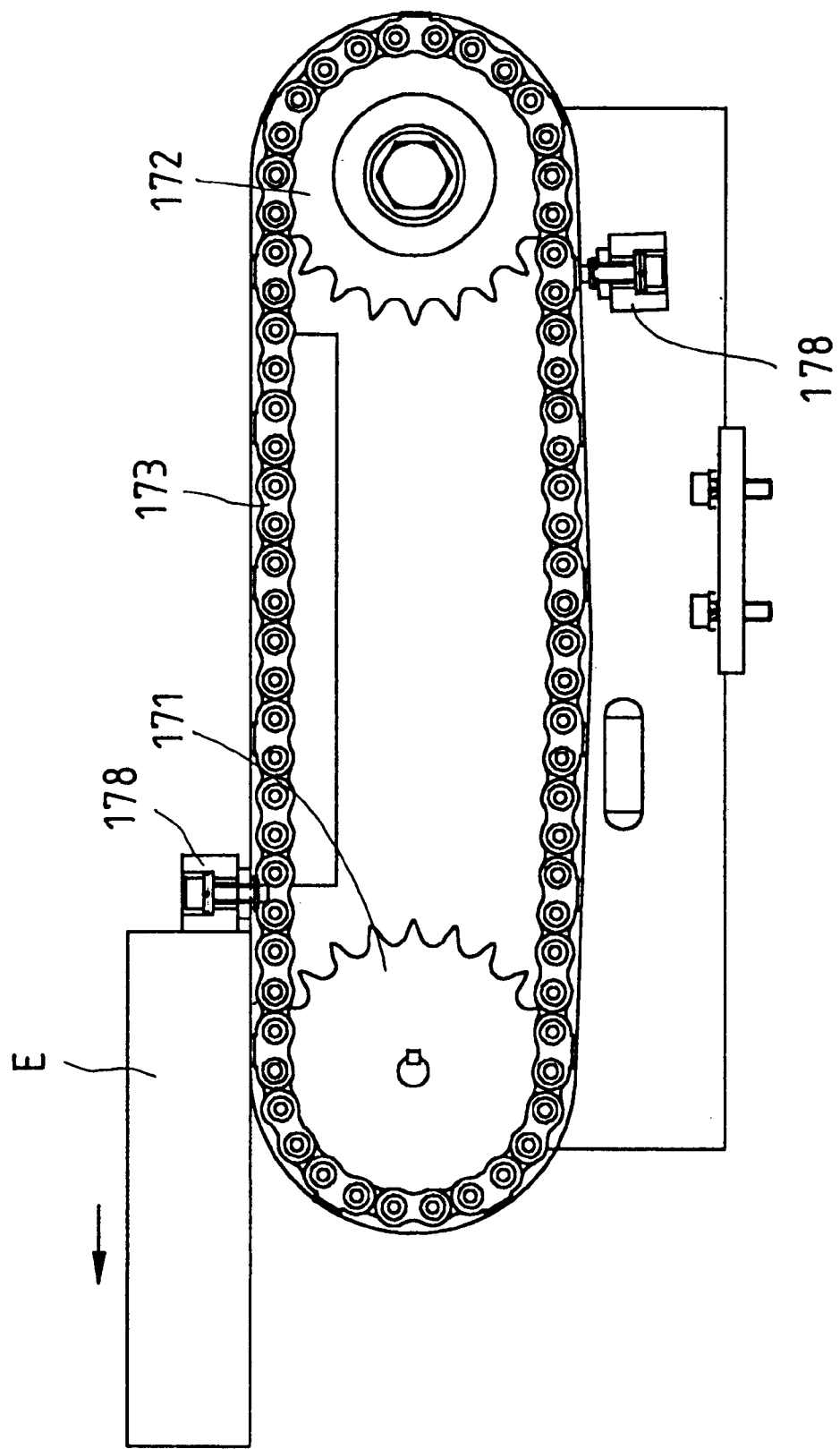
FIG. 6 shows an enlarged schematic view of the goods discharging mechanism as shown in FIG. 3.
Figure 7:
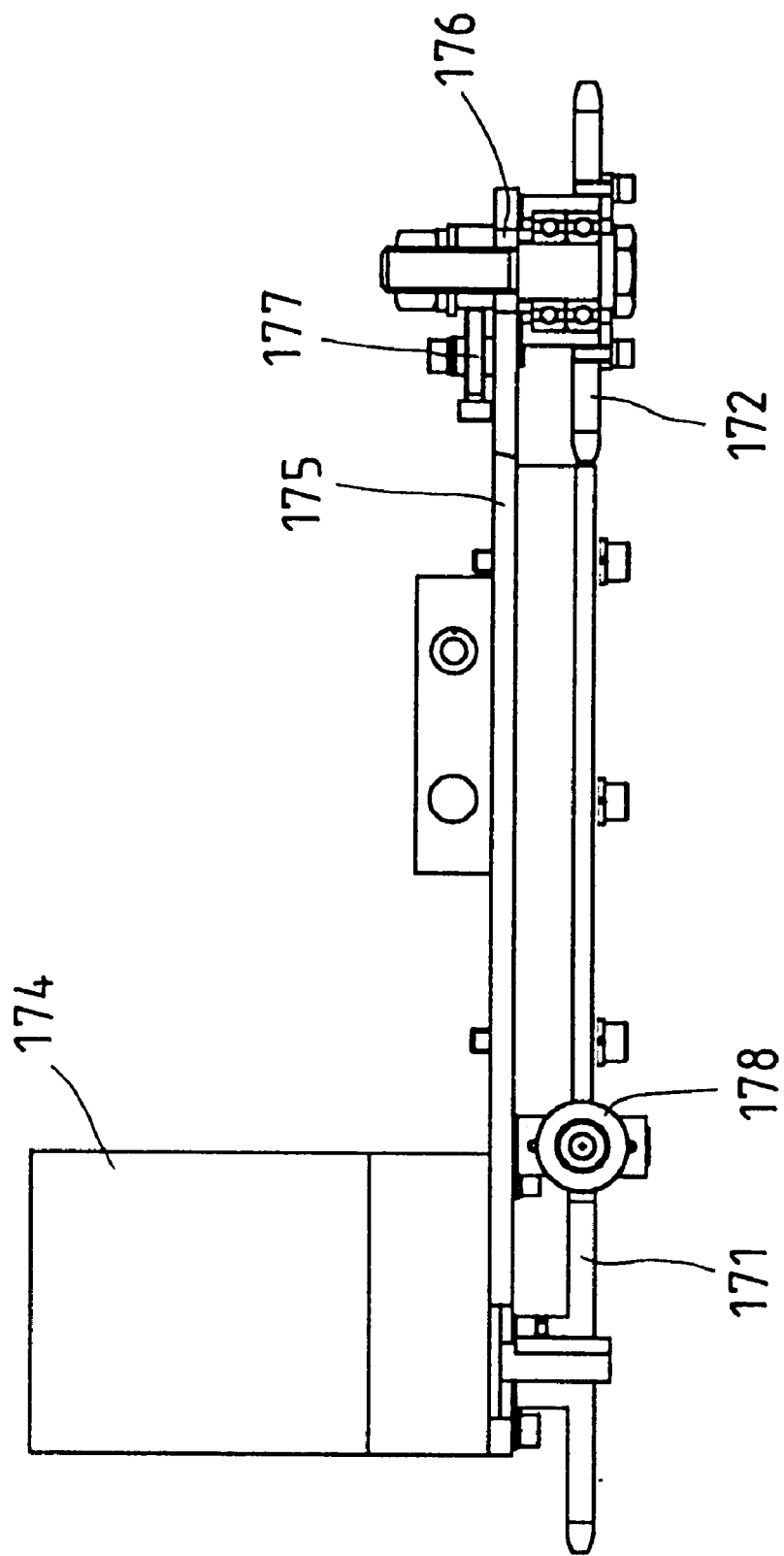
FIG. 7 shows a top view of FIG. 6.

A plurality of goods discharging mechanisms 17A . . . 17 are corresponding in location to the goods placing areas 13A, 13B, . . . 13P, such that they are located under the placing platform 16. As shown in FIGS. 6 and 7, the goods discharging mechanisms 17A . . . 17P are provided respectively with two chain wheel sets 171 and 172, and a chain set 173. The chain wheel set 171 is connected with a drive motor 174, whereas the chain wheel set 172 is pivoted to a long groove hole 176 of a fastening plate 175 and located by means of a push-stop screw 177. The chain 173 is provided with a plurality of pushing blocks 178 for pushing goods E to the first belt conveyor A.

If the adjustment in the allowable maximum length of the goods E is desired, the interval of the chain wheel sets 171 and 172 may be increased. That is to say that the chain 173 is lengthened, and that the chain wheel 172 is moved along the long groove hole 176 before being located by the push-top screw 177. In other words, the present invention allows an adjustment in size of the stacking space in accordance with the size of the goods.

Figure 8:
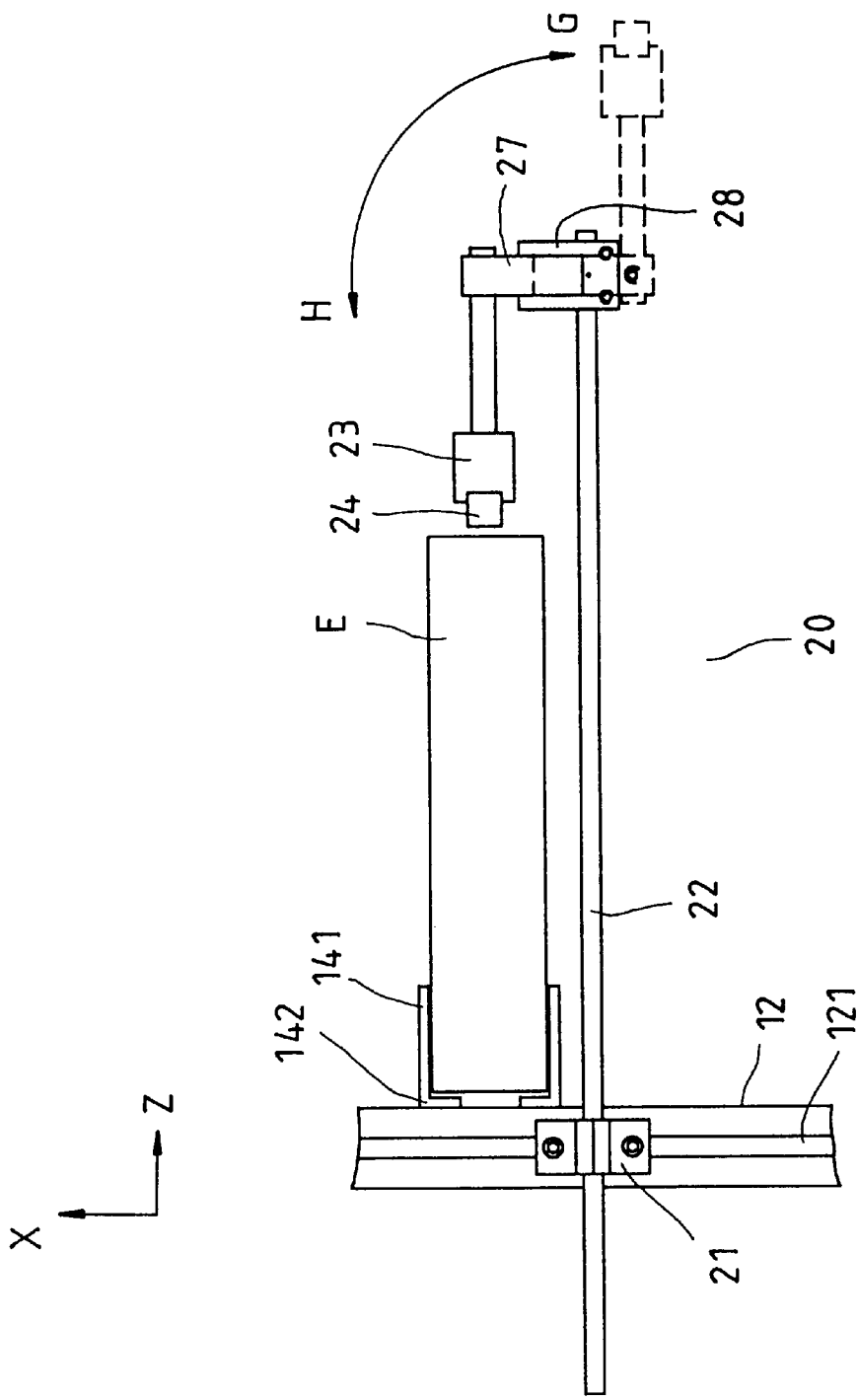
FIG. 8 shows an enlarged top view of an arresting rod adjusting mechanism of the present invention.

As shown in FIGS. 2 and 8, an arresting rod adjusting structure 20 is intended to prevent the collapse of the stacked goods and is composed of a clamping seat 21 capable of sliding along the X-direction to locate at a predetermined position of the horizontal connection portion 121 of the support rod 12 such that the clamping seat 21 is corresponding in location to each of the goods placing areas 13A, 13B, . . . A bracing rod 22 has one end which is engaged with the clamping seat 21, and other end which is provided with a fastening block 28 capable of being adjusted in length along the Z-direction after loosening the screw, so as to suit the length of various goods. The bracing rod 22 is provided at the tail end thereof with a clamping rod 23 pivoted thereto such that it holds a stop rod 24 for preventing the goods from giving way. The clamping rod 23 is mounted on a rotary block 27 and capable of turning on the pivoting point. When the goods are replenished, the clamping rod 23 is turned to the G position to avoid the interference. Under the circumstance that the goods discharging operation is under way, the clamping rod 23 is turned to the H position to avert the collapse of goods.

The present invention is provided with a method for controlling the operation of the automatic goods selection system. The control method is composed of a monitor computer PC and a programmable control device PLC. The monitor computer is intended to retrieve the order data, which are than transmitted to the PLC responsible for the control of mechanical actions. In light of the speed of execution of program by the computer and the PLC being faster than the speed of communication between the computer and the PLC, the control method of the present invention is capable of enhancing the communication efficiency.

As shown in FIG. 9, the first preferred embodiment of the control method of the present invention makes use of a computer into which the data of quantities of goods are keyed such that the data are arranged sequentially in a series of data for later retrieval. The series of data are so coded as to contain less words, which are then transmitted to the PLC in a faster manner and are than decoded by the PLC to control the mechanical actions. As shown in FIG. 9, assuming that a total of 16 goods placing areas (13A–13P) is set up, the prior art data transmission takes place in a way that the data are transmitted to each of the 16 goods placing areas. Such a prior art mode of the data transmission as described above is too slow and inefficient at best. In the present invention, the first coding process takes place in the computer such that the goods placing areas in which the goods are to be selected are coded as 1, and that the goods placing areas in which no goods are to be selected are coded as zero. For example, the goods placing areas 13A, 13C, 13E, 13I have the goods quantities of 3, 8, 1, and 11 respectively and are therefore coded as 1, whereas the rest of the goods placing areas has zero goods quantity and is therefore coded as zero. On the basis of the first coding, a second coding process is carried out such that the binary code of four digits is converted into the hexadecimal code to form a "A880" word. If the binary code of the first set 1010 is converted into the hexadecimal code, that is $1 \times 2^3 + 1 \times 2 = A$. If the binary code of the second set 1000 is converted into the hexadecimal code, that is $1 \times 2^3 = 8$, etc., so as to form the A880 word. The A880 word and the data of the goods selection quantities of 3, 8, 1, 11 are transmitted by the computer to the PLC by which the decoding is brought about. In this method, the 16 words of the prior art method are reduced by 11 words to 5 words which take less time to transmit. In the event that the number of the goods placing areas is greatly increased, the data transmission mode of the method of the present invention proves to be relatively efficient.

Figure 10:
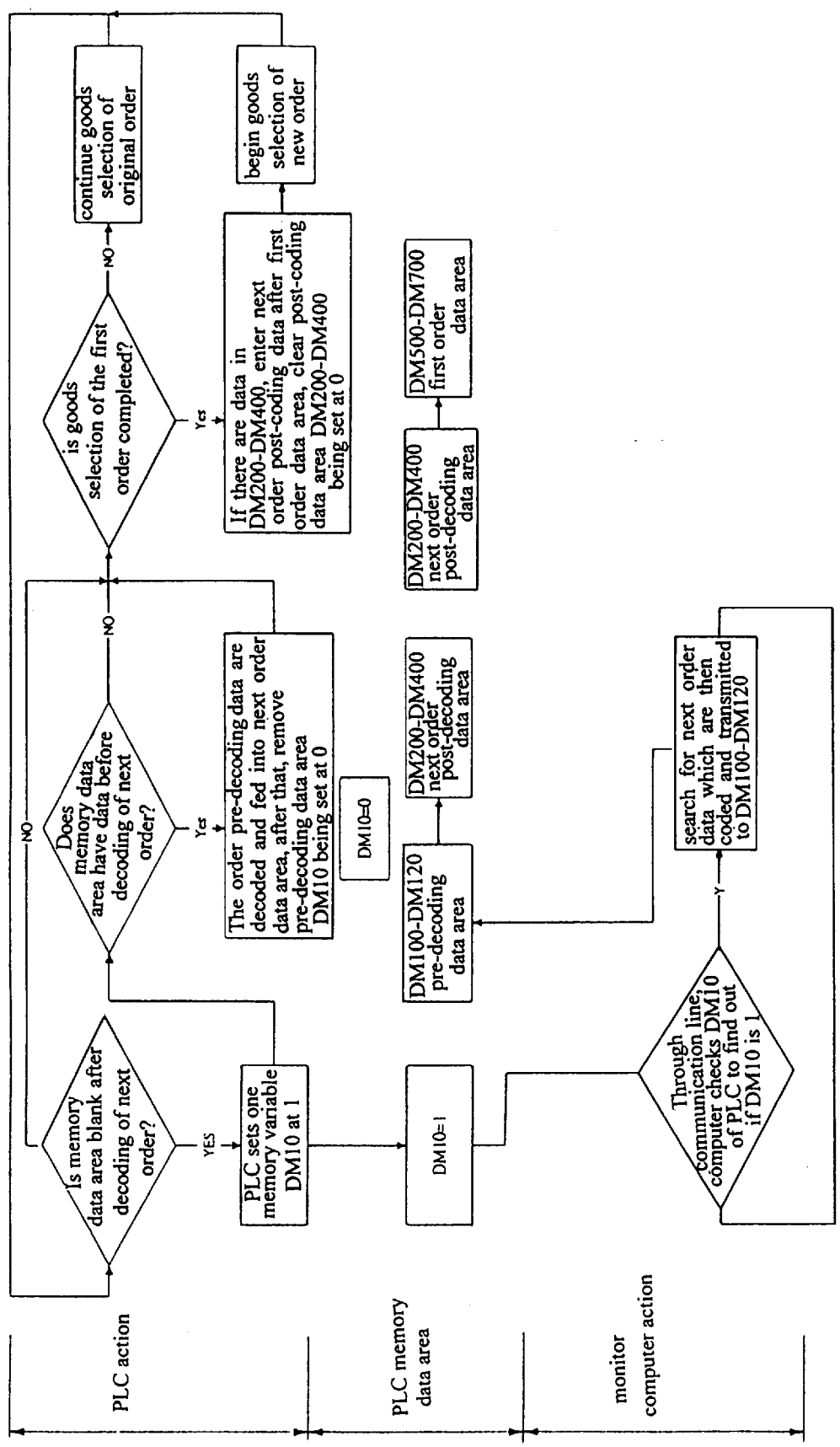
FIG. 10 shows a process flow of the data transmission of the monitor computer and PLC of a second preferred embodiment of the control method of the present invention.

Now referring to FIG. 10 in which the second preferred embodiment of the control method of the present invention is illustrated, the memory data area of the PLC is divided into the first-on-the line order data area (DM500–DM700) and the second-on-the-line order data area (DM100–DM400). If the goods data have been put through the coding and the decoding operations, the second-on-the-line order data area (DM100–DM400) is further divided into a second-on-the-line order data pre-decoding data area (DM100–DM120) and a second-on-the-line order data post-decoding data area (DM200–DM400). First of all, the PLC reads data from the first-on-the-line order data area (DM500–DM700) to execute the operation of goods selection. In the meantime, the memory data area (DM200–DM400) of the second-on-the-line order data post-decoding data area is checked in the goods selection process. In case of absence of data, the memory variable DM10 is set at 1; otherwise the memory variable DM10 is set at o. when the DIM10 is 1, it must be checked to see if there are data present in the DM100–DM120 area. If there are data, the decode is put into the DM200–DM400 area while the memory variable DM10 is set at 0. The computer checks to see if the memory variable DM10 is 1 through the communication line. If yes, after the search for the second-on-the line order data, the coding is carried out and transmitted into the DM100–DM120 area of the PLC. The flow of control is so carried out that the next batch of search transmission data is done in the period of goods selection, thereby resulting in a decrease in the data transmission time for each process of goods selection.

What is claimed is:

1. An automatic goods picking device comprising:

a frame;

a placing platform on at least one side of the frame;

at least one horizontal support rod fixed to the frame above the placing platform;

a plurality of goods placing areas each formed by two fastening members each of which is engaged by fastening means to slide horizontally along the support;

each of the two fastening members also being slidable perpendicular to the support on the fastening means;

said fastening means fixing the two fastening members in a selected horizontal and vertical position on the support rod to accommodate different sizes of the goods;

a plurality of goods discharging mechanisms fastened to a bottom of the placing platform corresponding in location to a bottom of each of the goods placing areas for discharging goods from said goods placing areas; and a stop rod adjusting structure mounted on said support rod such that said stop rod adjusting structure is corresponding to each of said goods placing areas, said stop rod adjusting structure having a clamping seat mounted slidably on said support rod, a bracing rod being engaged with said clamping seat such that said bracing rod is adjustable in length, and that said bracing rod is fastened pivotally at one end thereof with a clamping rod clamping a stop rod which is located outside each of said goods placing areas at an interval.

2. The device according to claim 1, further comprising another horizontal support rod fixed to the frame.

3. The device according to claim 1, wherein the fastening means is engaged in a horizontal slot in the support rod.

4. The device according to claim 1, wherein the fastening means is a screw nut.

5. The device according to claim 1, wherein the fastening means is engaged in a vertical slot in each of the two fastening members.

6. The device according to claim 1, wherein said stop rod is loosened by a rotary block screw of said clamping rod such that said stop rod is capable of an angular rotation.

7. The device according to claim 1, wherein each of said goods discharging mechanisms comprises two chain wheel sets engaged by a rotating chain, one of the wheel sets being driven by a motor, wherein said chain has pushing blocks for pushing the goods.

8. The device according to claim 7, wherein said wheel sets are adjustably spaced apart to accommodate different sizes of the goods.

* * * * *